US012042891B2

(12) United States Patent
Karna (10) Patent No.: US 12,042,891 B2
(45) Date of Patent: Jul. 23, 2024

(54) TOOL FOR ROTATABLE JOINTS

(71) Applicant: SANDVIK SRP AB, Svedala (SE)

(72) Inventor: Taisto Karna, Svedala (SE)

(73) Assignee: Sandvik SRP AB, Svedala (SE)

(*) Notice: Subject to any disclaimer, the term of this patent is extended or adjusted under 35 U.S.C. 154(b) by 194 days.

(21) Appl. No.: 17/771,340

(22) PCT Filed: Oct. 23, 2020

(86) PCT No.: PCT/FI2020/050701
§ 371 (c)(1),
(2) Date: Apr. 22, 2022

(87) PCT Pub. No.: WO2021/079031
PCT Pub. Date: Apr. 29, 2021

(65) Prior Publication Data
US 2022/0347806 A1     Nov. 3, 2022

(30) Foreign Application Priority Data
Oct. 25, 2019   (FI) .................................. U20190113

(51) Int. Cl.
*B23P 19/06*     (2006.01)
(52) U.S. Cl.
CPC ................... *B23P 19/06* (2013.01)
(58) Field of Classification Search
CPC ...... E21B 19/00; E21B 19/086; E21B 19/161; E21B 19/163; B23P 19/06; B23P 19/061
USPC ......... 81/54, 57, 57.15, 57.16, 57.17, 57.18, 81/57.19, 57.33, 57.34, 57.35, 57.36, 81/57.37, 57.2, 57.21, 57.22
See application file for complete search history.

(56) References Cited

U.S. PATENT DOCUMENTS

| 4,401,000 | A | 8/1983 | Kinzbach |
| 4,869,137 | A * | 9/1989 | Slator ..................... B25B 5/147 |
| | | | 81/421 |
| 6,227,076 | B1 | 5/2001 | Murray |
| 9,995,094 | B2 * | 6/2018 | Fulks ........................ E21B 3/04 |
| 2005/0188794 | A1 * | 9/2005 | Schulze-Beckinghausen ............. |
| | | | E21B 19/164 |
| | | | 81/57.34 |
| 2007/0068669 | A1 * | 3/2007 | Lesko ................... E21B 19/163 |
| | | | 166/85.1 |
| 2014/0076113 | A1 | 3/2014 | Berthier |
| 2016/0031067 | A1 | 2/2016 | Batt |

* cited by examiner

*Primary Examiner* — Brian D Keller
*Assistant Examiner* — Alberto Saenz
(74) *Attorney, Agent, or Firm* — Corinne R. Gorski (57) ABSTRACT

A tool for opening and/or closing rotatable joints, includes a slewing ring, a first grip member, and a second grip member. The first grip member is an annular plate. The second grip member includes two identical gripper arrangements, which include a gripper, an actuator, and bearing members of the actuator. The slewing ring includes an annular upper plate and an annular guide plate, between which plates grippers of the second grip member are arranged. The guide plate is arranged to slide in slots of slide pieces, which are in connection with the first grip member. The bearing members of the actuators are in connection with the first grip member, which actuators are arranged to move the grippers of the second grip member. The grippers are fastened to the slewing ring in a pivoted manner and arranged to grip the shaft of the joint.

5 Claims, 8 Drawing Sheets

TOOL FOR ROTATABLE JOINTS

Related Application Data

This application is a § 371 National Stage Application of PCT International Application No. PCT/FI2020/050701 filed Oct. 23, 2020 claiming priority to FI U20190113 filed Oct. 25, 2019.

BACKGROUND OF THE INVENTION

The invention relates to a tool for opening and/or closing a rotatable joint. The invention in particular relates to a tool used to open and close a rotatable largish joint.

BRIEF DESCRIPTION OF THE INVENTION

Rotatable largish joints are used in connection with crushers and other pieces of heavy machines. For example, an inner mantel of a cone crusher is often fixed to a support cone by a rotatable joint between the thread of the main shaft and a mounting nut. The rotatable joint has the tendency of tightening up as the crusher is running, so a lot of separating force is needed to open the joint. The nut is substantially annular, in other words the wall thickness is much smaller than the nut diameter whereby the nut, when being loosened, tends to bite into the thread due to deformation taking place in the nut. In such a case, it would be advantageous to unfasten of the nut with a force that is evenly distributed on the periphery of the nut. The joint is opened in connection with maintenance work with conventional impact-based tools that are difficult to use due to lack of space. Using these tools is also demanding from the viewpoint of work safety, and is a factor in causing accidents at work.

With the tool according to the invention, rotatable joints may be opened and closed in an industrially safe and prompt manner. A first grip member of the tool is placed in a form-locking way in connection with the rotating part of the rotatable joint, and at the same time a second grip member of the tool is placed in connection with the fixed part of the joint. Following this, the second grip member is brought to rotational motion with respect to the first grip member by an actuator, whereby the grip member tightens to the fixed part and the joint opens or closes depending on the direction of the rotational motion.

The inventive tool includes a slewing ring, a first grip member, and a second grip member. The first grip member is a plate that has form-locking surfaces to be adapted on a nut of the joint. In connection with the first grip member there are actuators that move the grippers of the second grip member. The second grip members are fastened to the slewing ring in a pivoted manner and adapted to grip the main shaft of the crusher. The slewing ring consists of an upper plate and a guide plate, located lower, between which plates the grippers of the second grip member are adapted. The guide plate is adapted to slide in slots of slide pieces which are in connection with the first grip member. The tool additionally includes pivot pins of the grippers, with their securing plates, limiting pins that limit the movement of the grippers, protective plates, and lifting lugs.

The inventive tool allows, for example, a nut adapted on the thread of a main shaft of a cone crusher to be unfastened and fastened, by means of which nut the inner mantle of the crusher is fixed in connection with a support cone of the mantle in question. The tool is lowered from above on the nut of the main shaft whereby the first grip member of the tool adapts to the nut in a form-locking manner. At the same time, the tool is centred in relation to the main shaft by means of guide pieces, after which the grippers are tightened to the main shaft by means of the actuators of the second grip member. When the movement of the actuators continues, rotational motion in the opposite directions is achieved between the first and second grip members, whereby the nut opens.

The first grip member has an internal form-locking shape which typically has four rectangular or square slots. Said shape fits in a form-locking manner in the corresponding external shape of the nut.

The second grip member is formed of two grippers arranged in a pivoted manner in connection with the slewing ring, which are moved by means of actuators, such as hydraulic cylinders, in connection with the first grip member. A gripper is formed of a plate-like lever arrangement which is in a pivoted manner in connection with the slewing ring. The gripper has a cylindrical surface which likewise adapts on the cylindrical surface of the main shaft and has gripper pieces to improve the friction characteristics of the gripper.

With the present invention, the shortcomings of known solutions are eliminated and a tool is accomplished by means of which rotatable joints may be opened and closed. The invention makes possible a tool that allows the opening and closing of largish joints safely and with good speed. This means that installation work can be carried out safely and efficiently, which lowers the costs.

Said advantages are achieved with the tool according to the invention, which is characterised by what is defined in the claims.

BRIEF DESCRIPTION OF THE FIGURES

In the following, the invention will be explained in detail by means of preferred embodiments and with reference to the accompanying drawings.

DETAILED DESCRIPTION OF THE INVENTION

Figure 1:
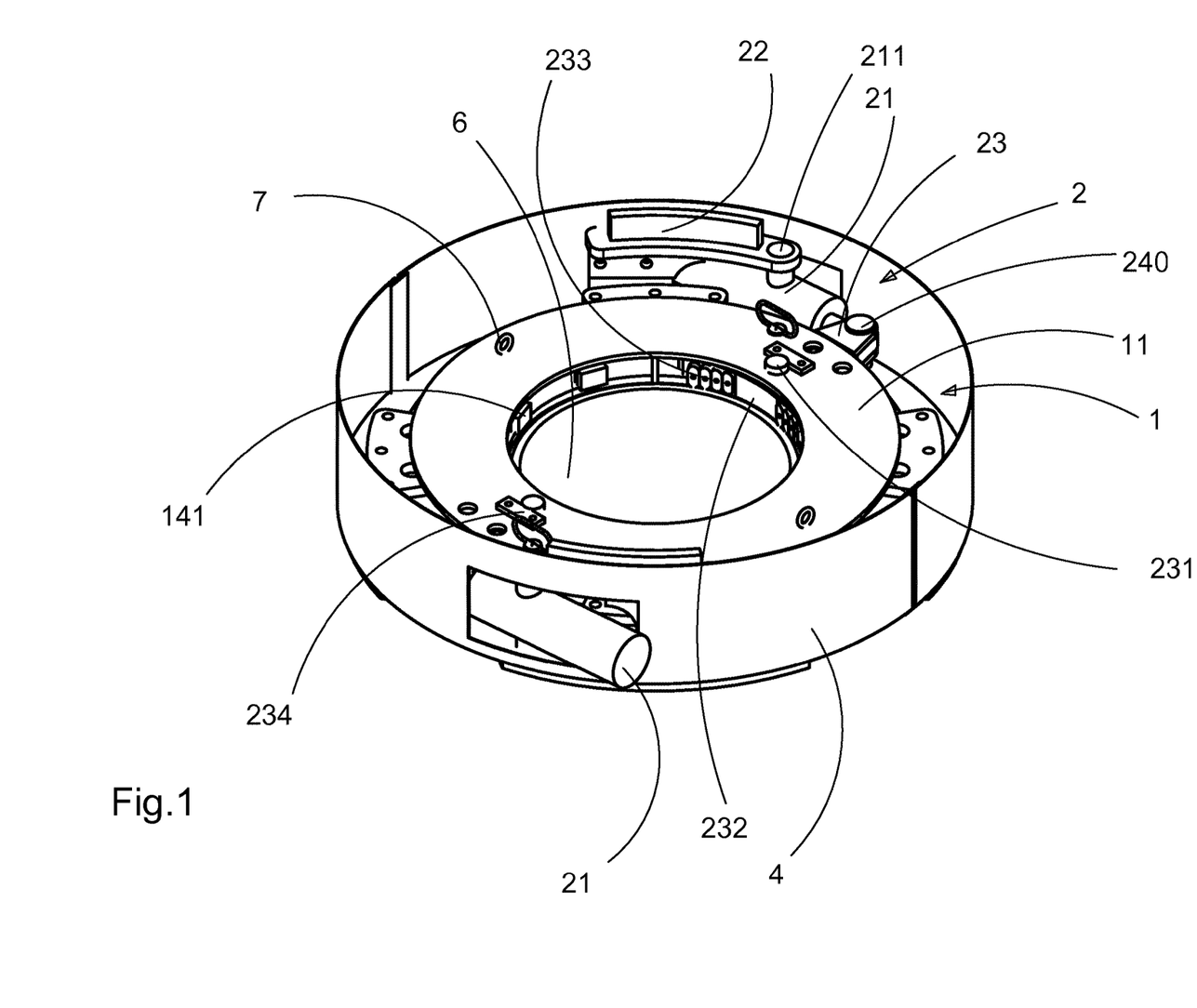
FIG. 1 shows the structure of the inventive tool obliquely from above.
Figure 2:
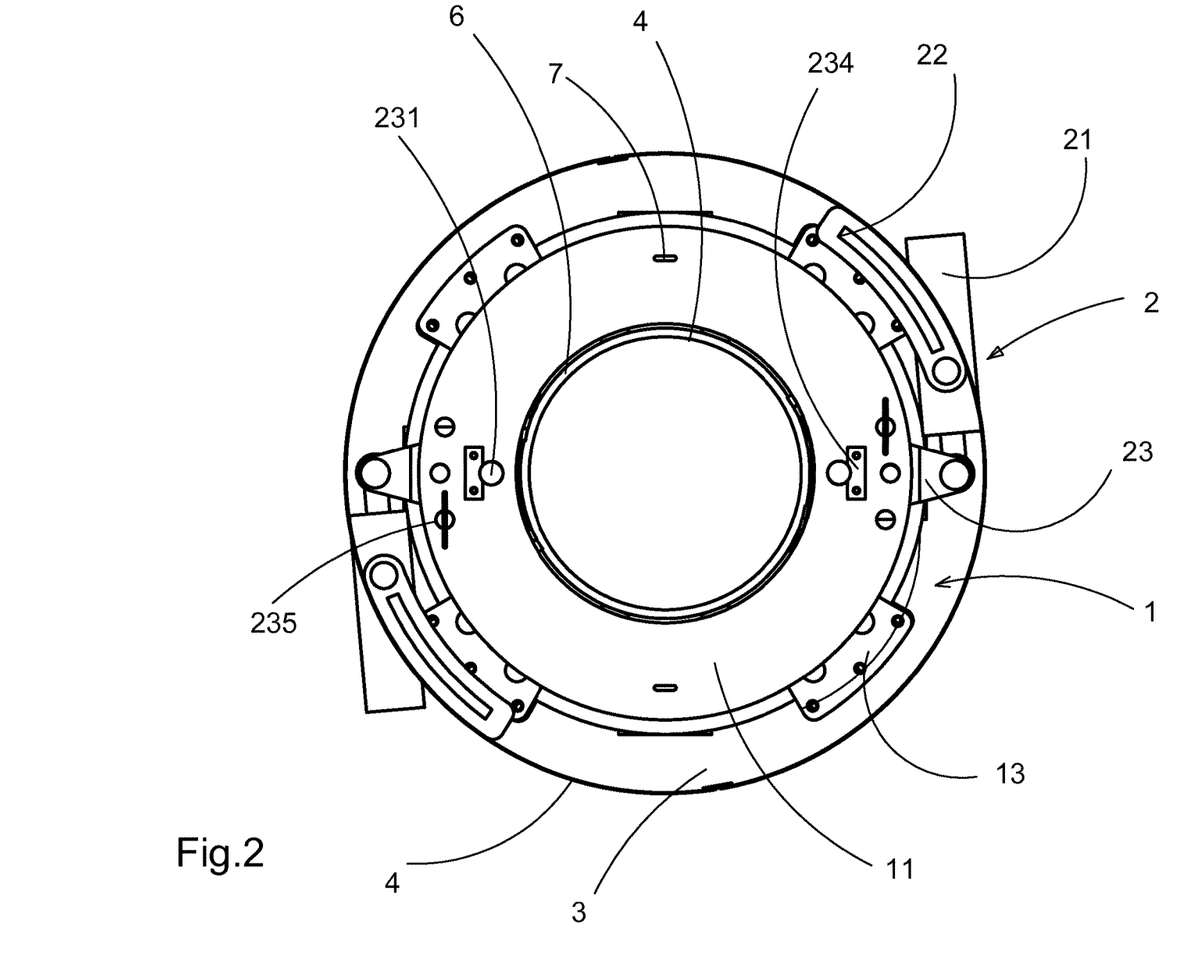
FIG. 2 shows the structure of the inventive tool from above.
Figure 3:
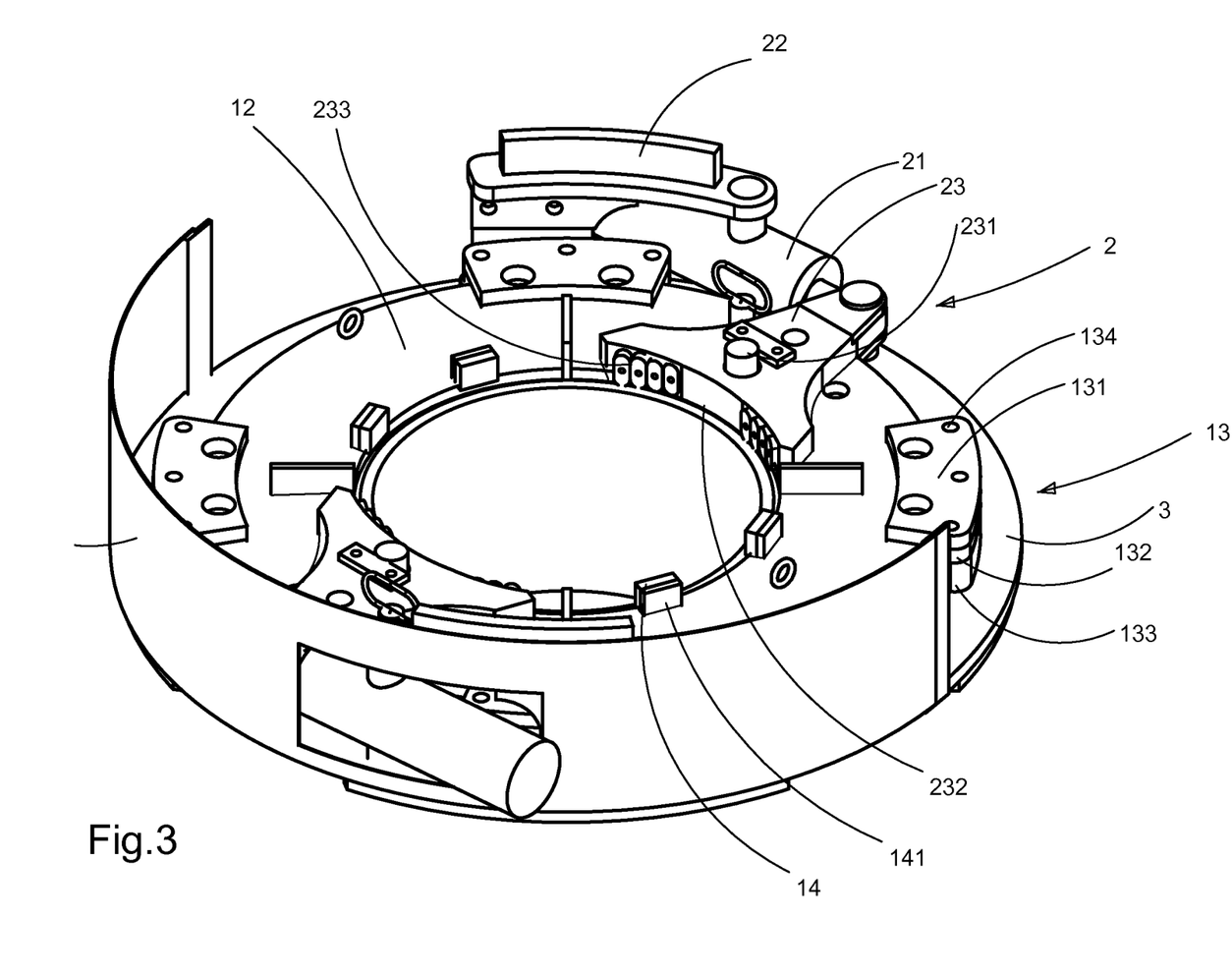
FIG. 3 shows the structure of the inventive tool obliquely from above with one of the protective plates and an upper plate of the slewing ring removed.
Figure 4:
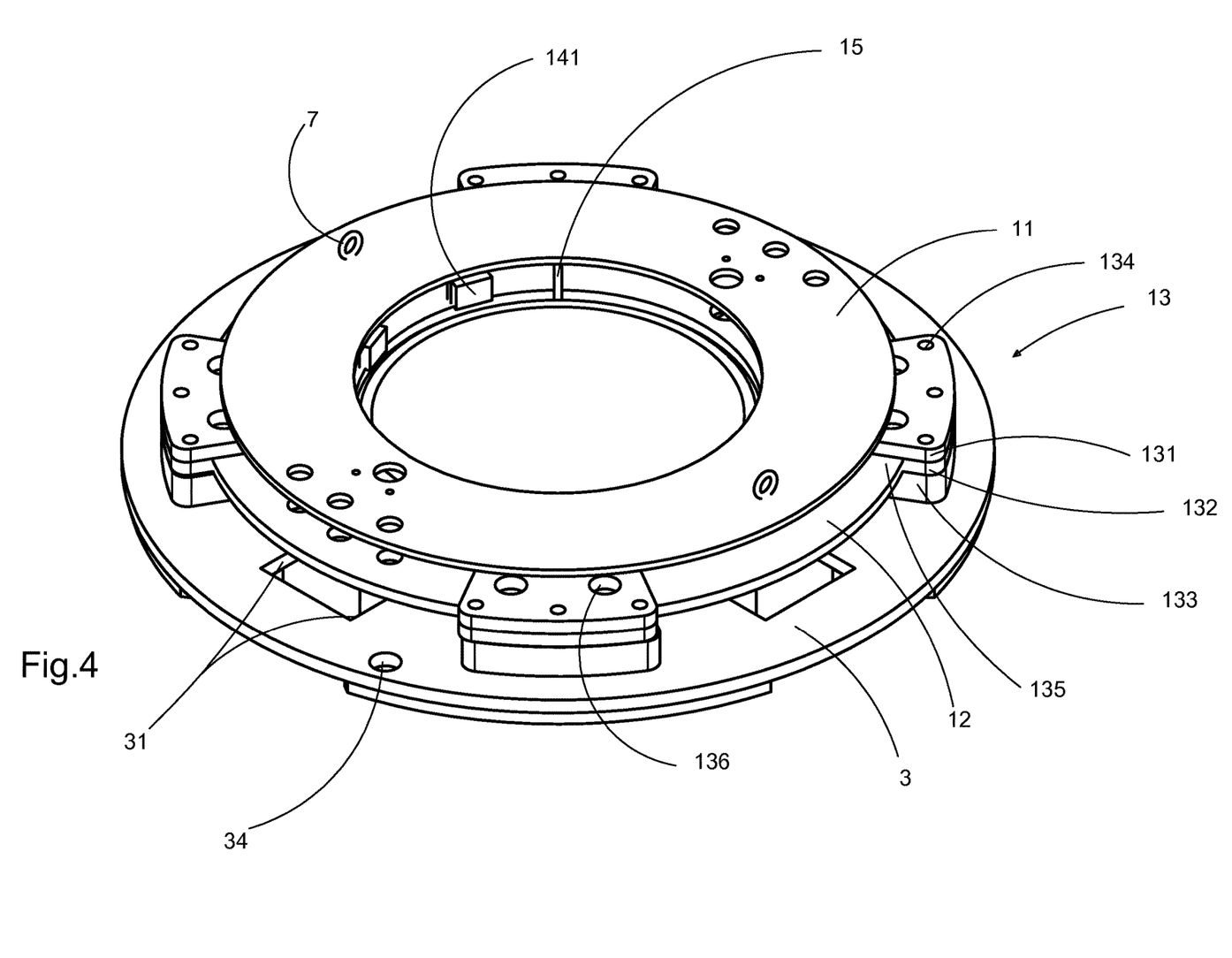
FIG. 4 shows a component assembly of the inventive tool, having a slewing ring and a first grip member as seen obliquely from above.
Figure 5:
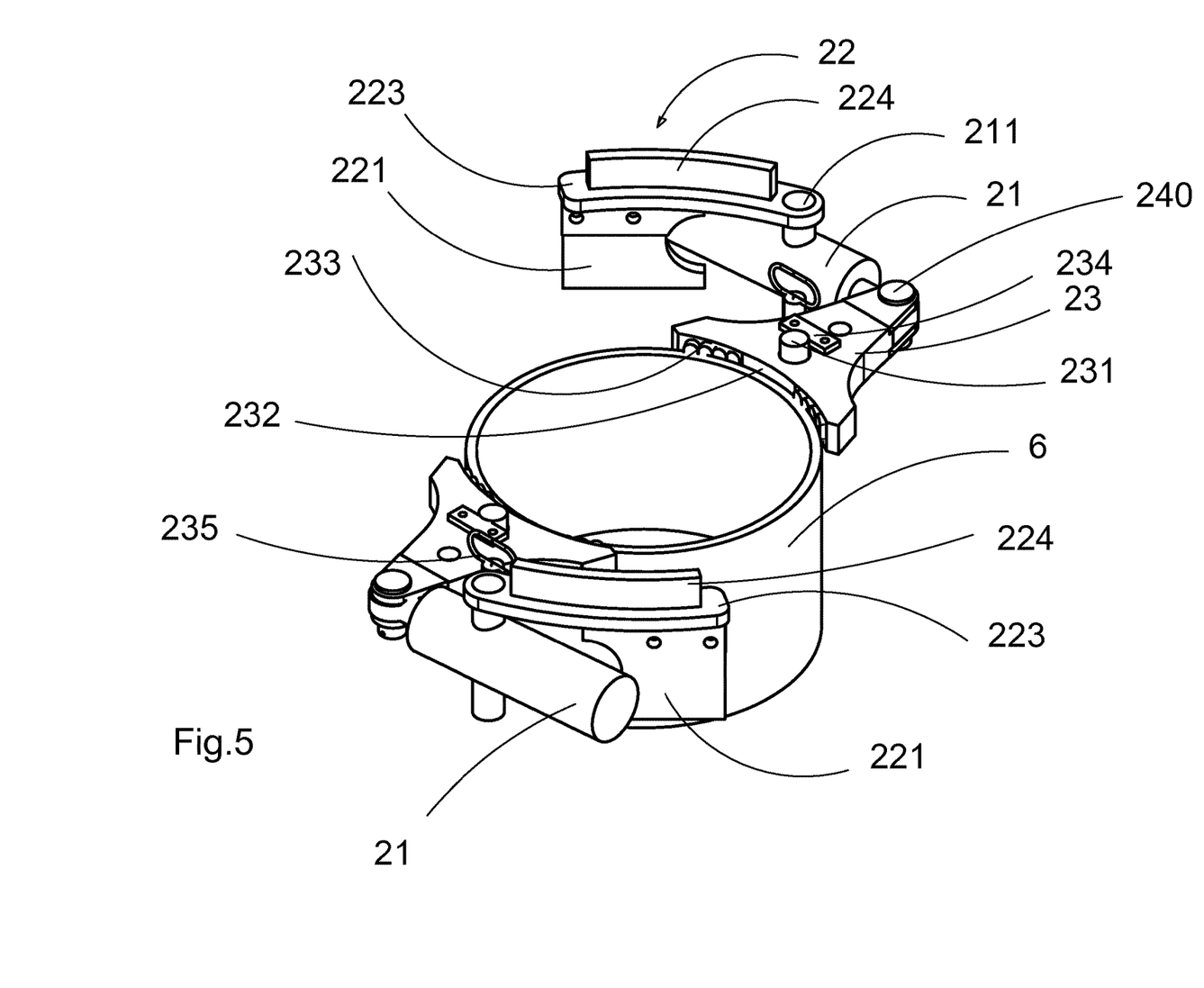
FIG. 5 shows a component assembly of the inventive tool, having a second grip member as seen obliquely from above.
Figure 6:
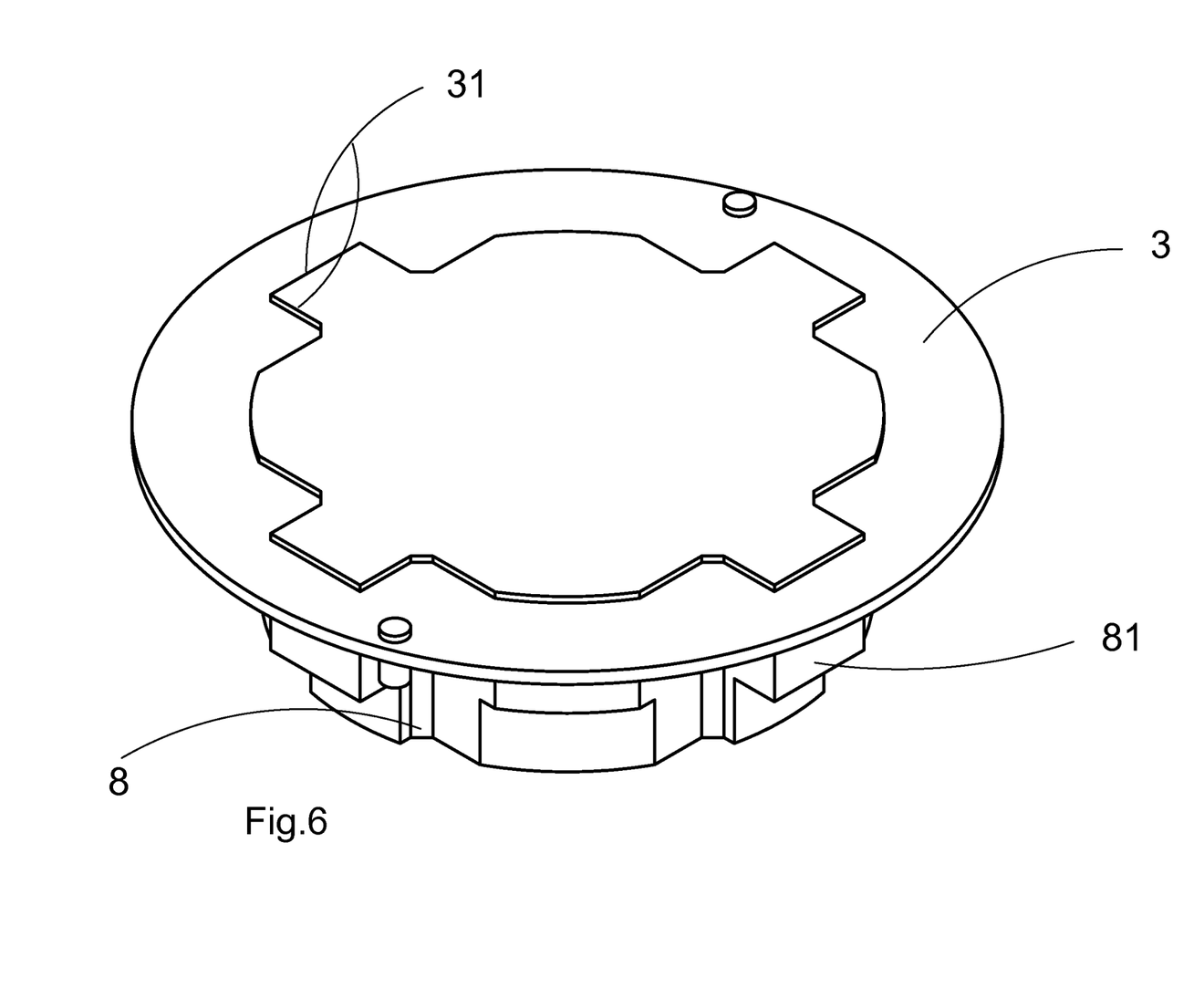
FIG. 6 is a schematic view of adapting the first grip member of the inventive tool on a nut which has four shapes adapting on slots of the grip member, as seen obliquely from above.
Figure 7:
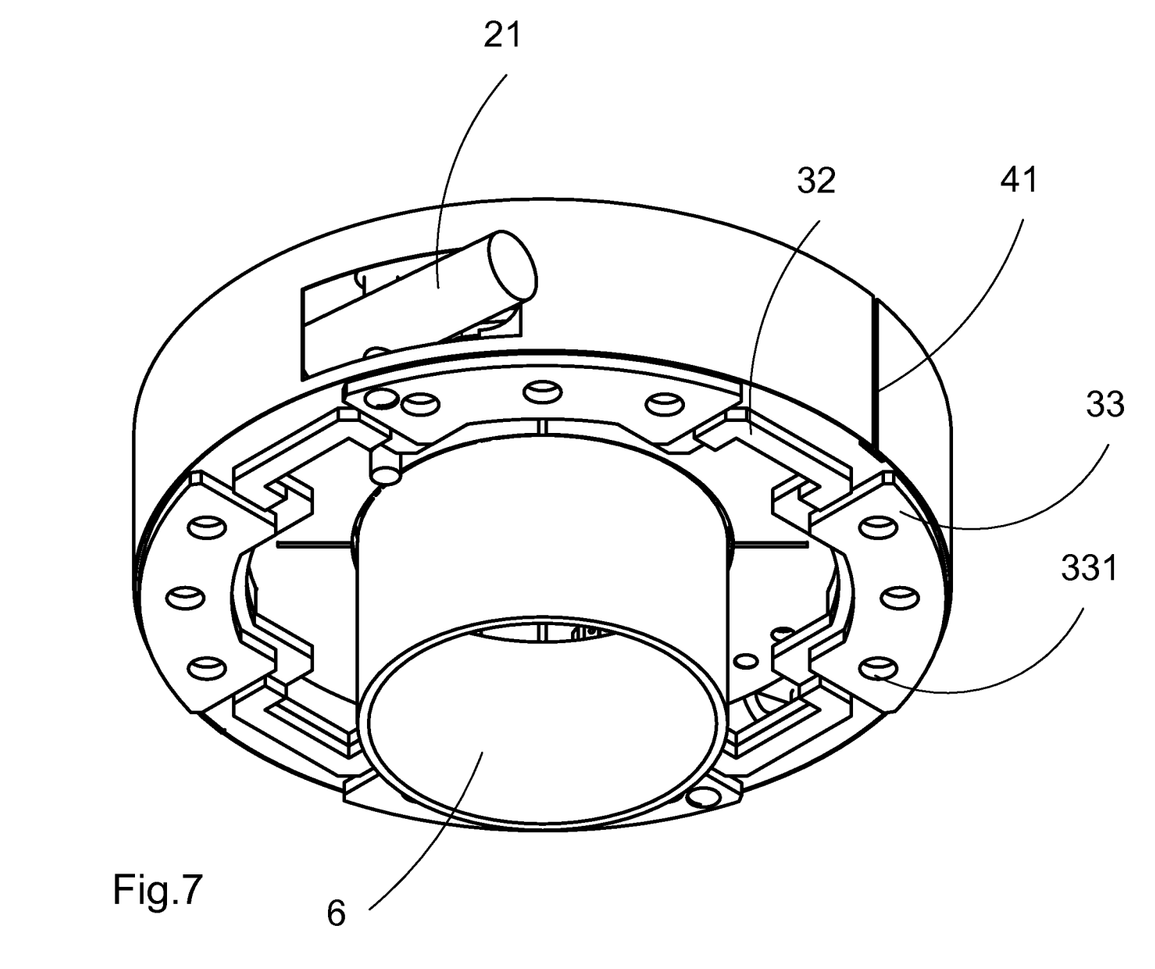
FIG. 7 shows the structure of the inventive tool as seen obliquely from below.
Figure 8:
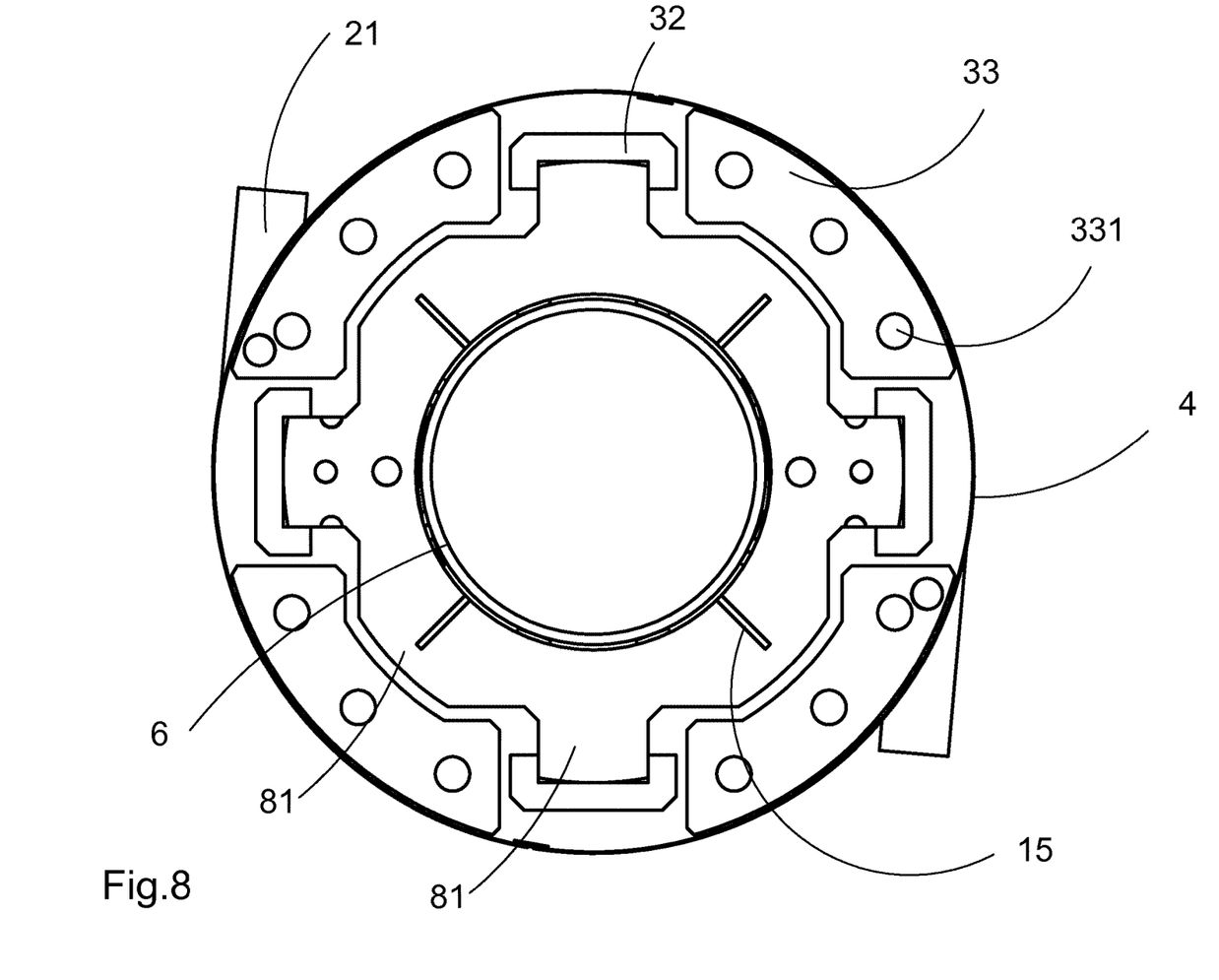
FIG. 8 shows the structure of the inventive tool as seen from below.

FIGS. 1 to 8 show a tool that includes a slewing ring 1, a first grip member 3, a second grip member 2, and protective plates 4.

The slewing ring 1 consists of an annular upper plate 11 and, placed lower, an annular guide plate 12, between which plates are adapted grippers 23 of the second grip member 2.

The centre hole of the plates is slightly larger than a shaft 6 of a rotatable joint. The plates 11 and 12 are interconnected by radial plate pieces 15 the height of which is slightly larger than the thickness of the gripper 23. On the edge of the centre hole of the guide plate 12, guide pieces 14 are arranged, which centre the tool onto the shaft. There are protective pieces 141 in connection with the guide pieces to prevent damages onto the surface of the shaft 6. On the upper plate 11, lifting lugs 7 are arranged.

The guide plate 12 is adapted to slide in slots 135 of slide pieces 13 which are in connection with the first grip member 3. The slide pieces consist of an upper piece 131, centre piece 132, and lower piece 133, which pieces are connected to the first grip member 3 by joint members 134, such as screws (not shown), passing through the pieces. The upper piece 131 and lower piece 133 are of the same size, but the centre piece 132 is smaller than them, thereby creating the slot 135. In the upper and lower pieces, spaces 136 are arranged in which separate slide elements (not shown) may be adapted. There are typically 3 to 5 slide pieces 13 placed on the outer circumference of the guide plate.

The first grip member 3 consist of an annular plate whose inner hole forms a form-locking surface 31 which may be adapted to a form-locking outer surface 81 of a nut 8. On the lower surface of the grip member 3, slot reinforcements 32 and reinforcements 33 are arranged, which add to the thickness dimension and strength of the grip member. The reinforcements are fixed in place by conventional methods, such as by welding. The reinforcements 33 are, for example, double-welded through the openings 331.

The second grip member 2 consists of two identical gripper arrangements which include a gripper 23, actuator 21, and bearing members 22 of the actuator. The gripper 23 is a plate with the shape of a substantially equilateral triangle, which is fastened in a pivoted manner at the centre of gravity of the plate between plates 11 and 12 of the slewing ring by means of a pivot pin 231. The pivot pin 231 is locked in place with conventional locking means 234.

The gripper 23 has a cylindrical surface 232 which likewise adapts on the cylindrical surface of the main shaft 6 and which has gripper pieces 233 to improve the frictional characteristics of the gripper and to protect the shaft surface. The gripper is fixed to the actuator 21 in a pivoted manner by means of a cylinder pin 240. The actuator 21, which is preferably a hydraulic cylinder pivoted at the centre, is bearing-mounted by its bearing pins 211 to the hole 34 of the plate of the first gripper 3 and to bearing means 22. The bearing members 22 consist of a vertical plate 221 at whose upper end a horizontal plate 223 is arranged. The bearing pin 211 of the actuator is adapted in a hole at the end of the horizontal plate. The horizontal plate is reinforced with a reinforcement plate 224.

To limit the movement of the grippers 23, limiting pins 235 may be adapted in the holes of the slewing ring either on the front or rear side of the gripper depending on the selected rotating direction of the tool. The limiting pins 235 ensure the correct position of the gripper when the tool is being removed from the object.

The protective plates 4 are adapted around the tool and fixed in place by fastening means 41.

The manufacturing materials of the tool are steel materials, bearing materials, friction materials, and protective materials of different kinds. The manufacturing and joining methods are methods suited to each detail.

The inventive tool allows, for example, a nut 8 adapted on the thread of a main shaft 6 of a cone crusher to be unfastened and fastened, by means of which nut the inner mantle of the crusher is fixed in connection with a support cone of the mantle in question. The tool is lowered from above on the nut of the main shaft whereby the first grip member 3 of the tool is adapted to the nut in a form-locking manner. At the same time, the tool is centred in relation to the main shaft by means of protective pieces 141. Following this, rotational motion of the grippers 23 around the pivot pins 231 is achieved by the actuators 21 of the second grip member 2, the rotational motion tightening the grippers 23 to the main shaft. When the movement of the actuators continues, rotational motion in the opposite directions is achieved between the first and second grip members, whereby the nut opens or correspondingly tightens.

The drawings and their disclosure are only intended to illustrate the present invention. The tool and its structure may vary in detail within the scope of the inventive idea disclosed in the attached claims. It is obvious for a person skilled in the art that the dimensions, technical solutions, and material choices of the invention may vary due to the purpose of use. The embodiment of the invention may vary within the scope of operating conditions, customer needs, and production methods.

The invention claimed is:

1. A tool for opening and/or closing rotatable joints, the tool comprising:
    a slewing ring having an annular upper plate and an annular guide plate disposed below the annular upper plate;
    a first grip member, wherein the first grip member includes an annular plate that has form-locking surfaces arranged to communicate with a nut of a joint of the rotatable joints; and
    a second grip member including two identical gripper arrangements which each of the two identical gripper arrangements include a gripper, an actuator, and bearing members of the actuator, wherein the gripper is a plate having a shape of a substantially equilateral triangle which is fastened in a pivoted manner at a centre of gravity of the plate between the annular upper and annular guide plates and of the slewing ring by means of a pivot pin, wherein the annular guide plate is arranged to slide in slots of slide pieces which are connected with the first grip member, the slide pieces including an upper piece, a centre piece, and a lower piece, wherein the upper, centre and lower pieces are connected to the annular plate of the first grip member by joint members, passing through the pieces, and wherein the upper piece and the lower piece are of a same size and the centre piece being smaller than the upper and lower pieces thereby creating the slot, wherein the gripper has a cylindrical surface which corresponds with a cylindrical surface of a shaft of the joint, and wherein the gripper includes gripper pieces, wherein the bearing members of the actuators are in connection with the first grip member, wherein the actuators are arranged to move the grippers of the second grip member, and wherein the grippers are fastened to the slewing ring in a pivoted manner and arranged to grip the shaft of the joint.

2. The tool as claimed in claim 1, wherein the gripper is fixed to the actuator in a pivoted manner by means of a cylinder pin, and wherein the bearing members include a vertical plate having an upper end and a horizontal plate arranged at the upper end, and wherein a bearing pin of the actuator is arranged in a hole at the end of the horizontal plate.

3. The tool as claimed in claim 1, wherein the actuator, which is a hydraulic cylinder pivoted at the centre, is bearing-mounted by bearing pins to a hole of the annular plate of the first grip member and to the bearing members.

4. The tool as claimed in claim 1, wherein, to limit a movement of the grippers, limiting pins are arranged in holes of the slewing ring either on a front or rear side of the gripper depending on a selected rotating direction of the tool.

5. The tool as claimed in claim 1, wherein the annular guide plate is arranged to slide in the slots of the slide pieces in opposite rotational motion of the first grip member and the second grip member.

\* \* \* \* \*